US011210542B2

(12) United States Patent
Mayer et al.

(10) Patent No.: US 11,210,542 B2
(45) Date of Patent: *Dec. 28, 2021

(54) CAPTURING DIGITAL IMAGES OF DOCUMENTS

(71) Applicant: Idemia Identity & Security USA LLC, Billerica, MA (US)

(72) Inventors: Joseph R. Mayer, Passaic County, NJ (US); Brian K. Martin, McMurray, PA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,743

(22) Filed: Jul. 9, 2020

(65) Prior Publication Data

US 2021/0174114 A1 Jun. 10, 2021

Related U.S. Application Data

(63) Continuation of application No. 16/229,814, filed on Dec. 21, 2018, now Pat. No. 10,733,469.

(Continued)

(51) Int. Cl.
*G06K 15/00* (2006.01)
*G06K 9/22* (2006.01)
(Continued)

(52) U.S. Cl.
CPC ......... *G06K 9/228* (2013.01); *G06K 9/00442* (2013.01); *G06K 9/00912* (2013.01);
(Continued)

(58) Field of Classification Search
None
See application file for complete search history.

(56) References Cited

U.S. PATENT DOCUMENTS 6,965,460 B1 ‡ 11/2005 Gann ..................... H04N 1/193
358/453
6,975,360 B2 ‡ 12/2005 Slatter ............... H04N 1/02815
348/218.1
(Continued)

FOREIGN PATENT DOCUMENTS

WO WO2013090843 ‡ 6/2013
WO WO2017084940 ‡ 5/2017

OTHER PUBLICATIONS

Google.com, [online] "PhotoScan: Photos from the past, meet scanner from the future", [retrieved on Dec. 12, 2018] retrieved from: URL https://www.google.com/photos/scan/, 4 pages.‡

(Continued)

*Primary Examiner* — Dung D Tran
(74) *Attorney, Agent, or Firm* — Fish & Richardson P.C.

(57) ABSTRACT

Methods, systems, and apparatus, including computer programs encoded on a computer storage medium, for obtaining, in real-time from an image capture device, a video stream comprising images of a document by a computing device. The computing device provides, for display in an image preview window, the video stream overlaid with a graphical capture guide. In response to detecting a lighting artifact in at least one image of the video stream, the computing device modifies the graphical capture guide within the image preview window. The computing device captures one or more of the images of the document from the video stream.

20 Claims, 10 Drawing Sheets

Related U.S. Application Data

(60) Provisional application No. 62/612,016, filed on Dec. 29, 2017.

(51) Int. Cl.
| | | |
|---|---|---|
| *G06T 11/00* | (2006.01) | |
| *H04N 5/232* | (2006.01) | |
| *G06K 9/00* | (2006.01) | |
| *G06K 9/32* | (2006.01) | |
| *H04N 1/00* | (2006.01) | |

(52) U.S. Cl.
CPC ............ *G06K 9/3275* (2013.01); *G06T 11/00* (2013.01); *H04N 1/00244* (2013.01); *H04N 5/23222* (2013.01); *H04N 5/23293* (2013.01); *H04N 5/232945* (2018.08)

(56) References Cited

U.S. PATENT DOCUMENTS

| | | | | |
|---|---|---|---|---|
| 7,619,664 | B2 ‡ | 11/2009 | Pollard | H04N 1/00835 348/241 |
| 7,760,962 | B2 ‡ | 7/2010 | Sambongi | G06T 5/50 382/153 |
| 9,503,612 | B1 ‡ | 11/2016 | Pashintsev | H04N 5/2354 |
| 9,742,952 | B2 ‡ | 8/2017 | Gibbons | H04N 1/195 |
| 9,911,395 | B1 ‡ | 3/2018 | Townsend | G06F 1/1686 |
| 9,912,847 | B1 ‡ | 3/2018 | Yuan | H04N 5/225 |
| 10,262,220 | B1 ‡ | 4/2019 | Pribble | G06K 9/2027 |
| 2014/0050398 | A1 ‡ | 2/2014 | Pashintsev | G06K 9/6202 382/167 |
| 2014/0072201 | A1 | 3/2014 | Tilt | |
| 2014/0270400 | A1 ‡ | 9/2014 | Natale | G06Q 10/02 382/115 |
| 2014/0375862 | A1 ‡ | 12/2014 | Kim | H04N 5/23245 348/33 |
| 2015/0117849 | A1 ‡ | 4/2015 | Kasahara | G03B 15/05 396/16 |
| 2016/0188958 | A1 | 6/2016 | Martin | |
| 2017/0064200 | A1 ‡ | 3/2017 | Castillo | H04N 13/221 |
| 2017/0359560 | A1 | 12/2017 | Winn et al. | |
| 2018/0213147 | A1 ‡ | 7/2018 | Miyamoto | H04N 5/23222 |
| 2019/0043180 | A1 ‡ | 2/2019 | Mayer | G06T 5/005 |
| 2019/0191078 | A1 ‡ | 6/2019 | Nanaumi | H04N 5/23222 |

OTHER PUBLICATIONS

PCT International Search Report in International Application No. PCT/USS2018/067798, dated Apr. 8, 2019, 16 pages.

‡ imported from a related application

CAPTURING DIGITAL IMAGES OF DOCUMENTS

CROSS-REFERENCE TO RELATED APPLICATION

This is a continuation of U.S. application Ser. No. 16/229,814, filed Dec. 21, 2018, which claims the benefit of the filing date of U.S. Provisional Application No. 62/612,016, filed on Dec. 29, 2017, the contents of which are incorporated herein by reference in their entirety.

TECHNICAL FIELD

This document generally relates to improving the acquisition of images by digital image capture devices to reduce or eliminate the effects of glare.

BACKGROUND

The increased use of mobile devices such as cell phones and tablets has invigorated capturing samples of secure credentials to support remote identity assertion. While the intention is for a user to authenticate an identity through the Internet, the rising rates of identity theft and fraud, especially in the on-line context, can effectively impede the development of technologies for on-line transactions. In this context, to verify one's identity with a mobile capture of a secure credential such as a driver's license, passport or ID card, a high quality sample is preferable. However, lighting artifacts such as glare and shadows may hinder document authentication efforts. Improvements to digital image capture devices and processes that reduce or eliminate reflections or glare on imaged documents are desirable.

SUMMARY

This specification relates to improvements to image capture devices (e.g., digital cameras) to prevent, reduce, or eliminate lighting artifacts such as glare or shadows from images captured by the device. Implementations of the present disclosure are generally directed to systems, devices, and methods for user interfaces that guide a user to manipulate a document in a manner that reduces glare or shadows in captured images. The proposed capture techniques seek to reduce the frequency with which the user's capture session results in samples unfit for the required validation operations. To effectively mitigate or reduce the deleterious effects of lighting artifacts (e.g., glare or shadows) during document capture using a computing device, some implementations modify characteristics of an image capture guide in a capture preview window during the capture session. In some implementations, the user interfaces can be used to guide a user to manipulate a document in a manner that improves the detectability of document security features in images of the document.

In general, innovative aspects of the subject matter described in this specification can be embodied in methods that include the actions of obtaining, in real-time from an image capture device, a video stream comprising images of a document by a computing device. The computing device provides, for display in an image preview window, the video stream overlaid with a graphical capture guide. The computing device modifies the graphical capture guide within the image preview window. The computing device captures one or more of the images of the document from the video stream. Other implementations of this aspect include corresponding systems, apparatus, and computer programs, configured to perform the actions of the methods, encoded on computer storage devices. These and other implementations can each optionally include one or more of the following features.

In some implementations, the modification to the graphical capture guide within the image preview window is applied in response to detecting a lighting artifact in at least one image of the video stream.

In some implementations, modifying the graphical capture guide within the image preview window includes translating the graphical capture guide away from a center of the image preview window.

In some implementations, modifying the graphical capture guide within the image preview window includes skewing one side of the graphical capture guide causing the graphical capture guide to have a tilted perspective.

In some implementations, modifying the graphical capture guide within the image preview window includes rotating the graphical capture guide.

Some implementations include sending at least one of the images of the document from the video stream to a server, and receiving, from the server, a response indicating an authenticity of the document.

Some implementations include capturing at least one of the images of the document from the video stream when the document as depicted the at least one of the images substantially aligns with the graphical capture guide.

Some implementations include, in response to detecting a security feature on the document in one or more of the images of the video stream, capturing at least one of the one or more images of the video stream, and sending the at least one of the one or more images to a server.

Some implementations include identifying, from the images of the document in the video stream, movement of the document relative to the image capture device in response to modifying the graphical capture guide in the image preview window, and, in response to identifying the movement of the document, providing, to a server, data confirming liveness of the images of the document in the video stream.

These and other implementations can each provide one or more advantages. In some examples, implementations of the present disclosure improve the operation image capture devices by, for example, removing glare from images captured by the image capture device. Implementations may provide processes for reducing or eliminating glare from images of documents captured by digital image capture devices.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
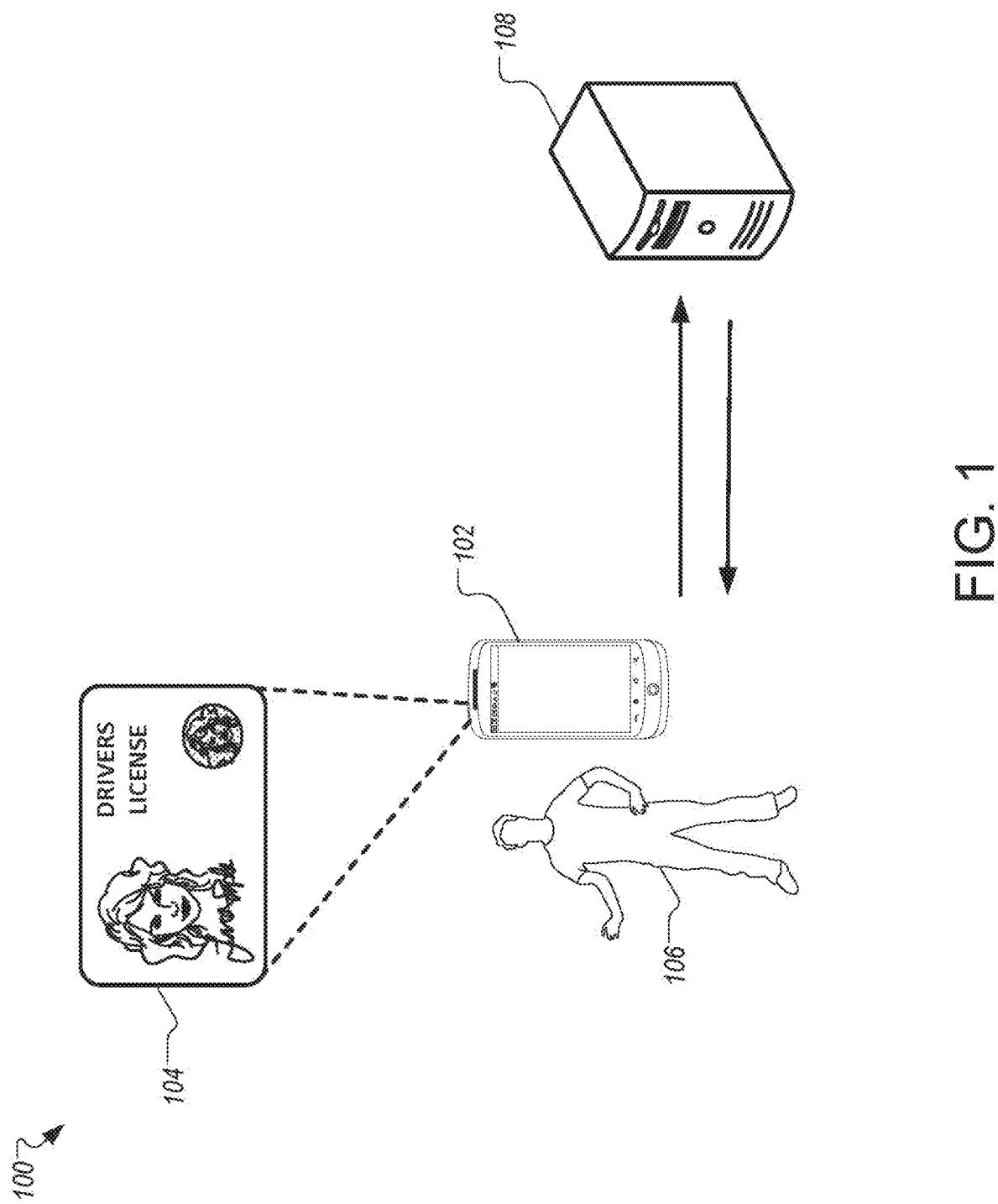
FIG. 1 depicts an example system according to implementations of the present disclosure.

A document may be imaged to generate a digitized copy of the document. For example, a document may be imaged by taking a photo of a document with a capture device. A digital capture device may include a mobile computing device with a camera, e.g., a phone with a camera, a tablet with a camera, a standalone digital camera, or some other device that can capture a digital image of a view.

However, acquisition of a digitized copy of a document with a photo or video capture device may be corrupted by the presence of lighting artifacts such as glare or shadows. For example, glare on a document may refer to brightness that obscures underlying characteristics of the document. Glare may make data extraction from a digital copy difficult or impossible. For example, glare shown on a portion of a document may make it impossible to perform optical character recognition on portions of the image that show glare.

Mild glare effects, or simple overexposure, may be corrected to some extent with image post processing operations to improve contrast in the affected areas. However, glare that completely obscures all underlying features may not be recoverable in this way. For example, if a large portion of an image of a document is pure white because of glare on the document, it may be impossible to extract features from that portion of the document.

Glare may be especially problematic in imaging identification documents such as driver's licenses, passports, or other documents with a reflective or semi-reflective surface. These identification documents may be used to verify ages, prove driving privileges, access a secure area, cash a check, and so on, so correctly extracting all features of the document is important. Additionally, identification documents are often targets for counterfeiting and fraud so correctly extracting embedded security features may be important to prove the authenticity of the documents. Furthermore, identification documents are frequently laminated which may make the documents more reflective and more prone to showing glare than unlaminated documents.

Identification documents ("ID documents") are broadly defined to include, for example, credit cards, bank cards, phone cards, passports, driver's licenses, network access cards, employee badges, debit cards, security cards, visas, immigration documentation, national ID cards, citizenship cards, permanent resident cards (e.g., green cards), Medicare cards, Medicaid cards, social security cards, security badges, certificates, identification cards or documents, voter registration cards, police ID cards, military ID cards, border crossing cards, legal instruments, security clearance badges and cards, gun permits, gift certificates or cards, membership cards or badges, etc. Also, the terms "document," "card," "badge" and "documentation" are used interchangeably throughout this patent application.

Glare and shadow detection through image processing can be used to advise a user during capture that an image is corrupt and prompt the user to correct the capture setup to remove the glare. Correcting a capture setup may include manipulating the position of the document relative to the image capture device. For example, to reduce reflections or shadows on the surface of the document, the document may be moved within the field of view (FOV) of the capture device, tilted, rotated, or a combination thereof. In some examples, rotation of the document can be considered to include out-of-plane rotation (e.g., tilting) as well as in-plane-rotation.

Accordingly, a user can be prompted to manipulate a document in a manner that reduces glare or shadows by modifying the size, shape, or orientation of an image capture guide in a preview window. Modifying the image capture guide—to which the user is expected to align a document— may prompt the user to adjust the position of the document relative to the lens of a digital camera to compensate for change in the capture guide, thereby, moving the document in a manner that reduces or eliminates the reflections causing glare in the digital images.

The document that is imaged may be an ID document, as described above. The digital image of the ID document with reduced glare can be used to authenticate the ID document or identity of person that presents the ID document. For example, embedded visual security features can be extracted from the final digital image of the ID document and used to authenticate the ID document, or an image of the person extracted from the final digital image of the ID document can be compared to an image of a person captured at the time of authentication.

FIG. 1 illustrates an example ID authentication system 100 that could implement the techniques of the present disclosure. System 100 includes a user computing device 102 in communication with an ID authentication server 108. The authentication server 108 can be a system of one or more computer servers. The authentication server 108 can be, for example, a secure data server system such as an identity verification system. The user computing device 102 can be, but is not limited to, a computing device such as a mobile phone, a smartphone, a tablet computer, a laptop computer, or a desktop computer. The user computing device 102 is configured to capture digital images of an ID document 104. For example, user computing device 102 may have an integrated digital camera or be connected a digital camera (e.g., a wired or wireless webcam). Additionally, the user computing device 102 can include a software application (e.g., a document scanning application or camera drivers) that, when executed by processor(s) of the computing device, allow the computing device to perform the image capture processes described herein.

Figure 2A:
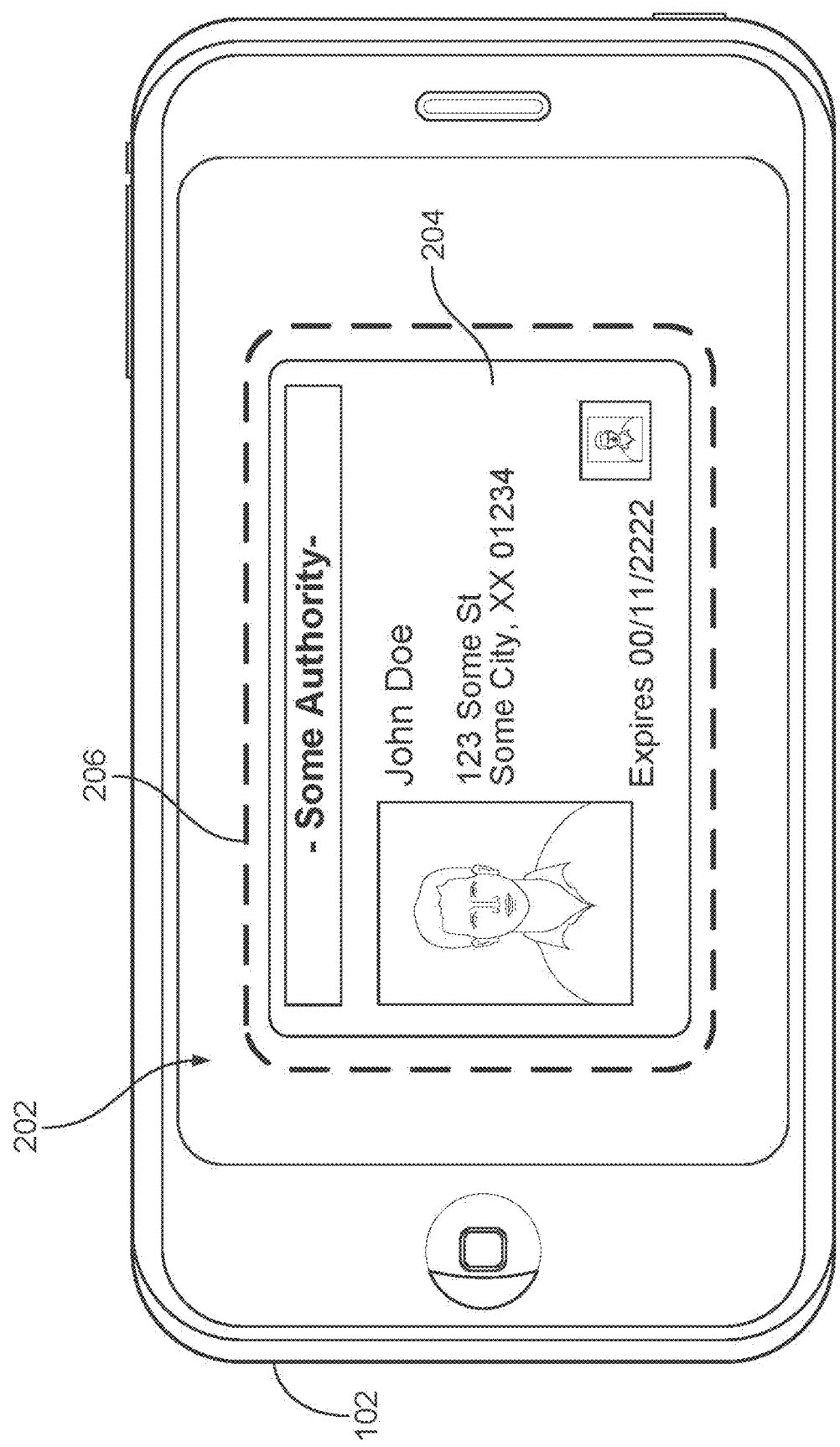
FIGS. 2A, 2B, and 3 depict an example image capture interface to direct a user to center the document in the frame for acquisition.
Figure 2B:
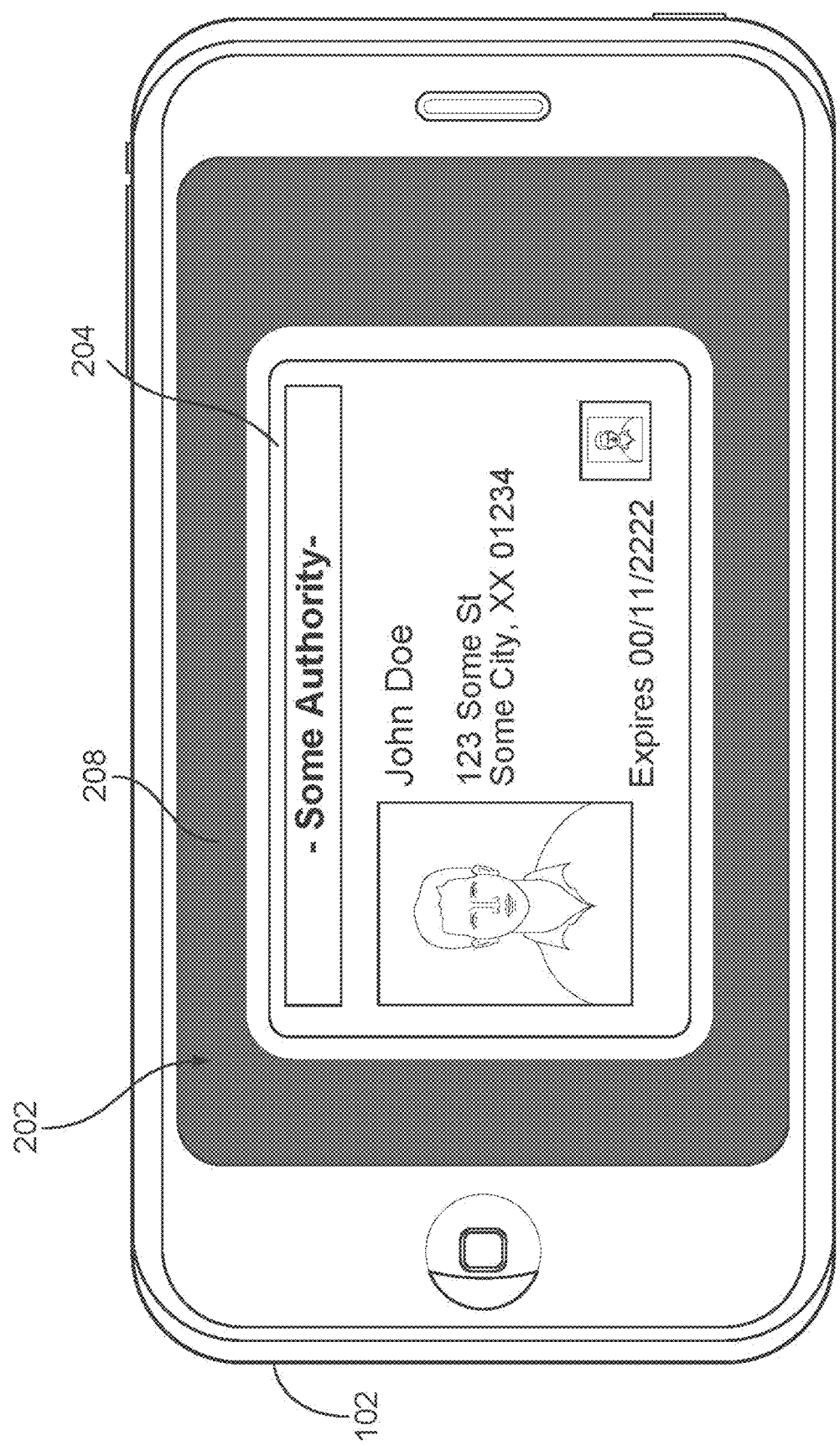

The user computing device 102 is configured to display an image preview window when a user 106 activates the camera on the computing device 102 to capture an image of an ID document 104. FIG. 2A depicts an example image preview window 202. For example, the image preview window 202 includes a preview image 204 of the ID document 104. The preview image 204 can be a real-time video stream of images of the ID document 104 as observed by the camera on the computing device 102, however, for simplicity of discussion the video images may be referred to in the singular as a "preview image" or a "real-time image" of the ID document 104. In some examples, the preview window 202 can also include an image capture guide 206. For example, image capture guide 206 can be a graphic that is overlaid on top of the preview image 204 of the ID document 104 to aid the user 106 with aligning the ID document 104 in the camera's FOV. FIG. 2B depicts another example image preview window 202 with a different style image capture guide 208. For example, image capture guide 206 is depicted as a dashed outline. Image capture guide 208 is depicted as a dark mask exposing only the part of the preview window 202 which should contain the ID document 104 when it is properly aligned with the capture guide 208.

Figure 3:
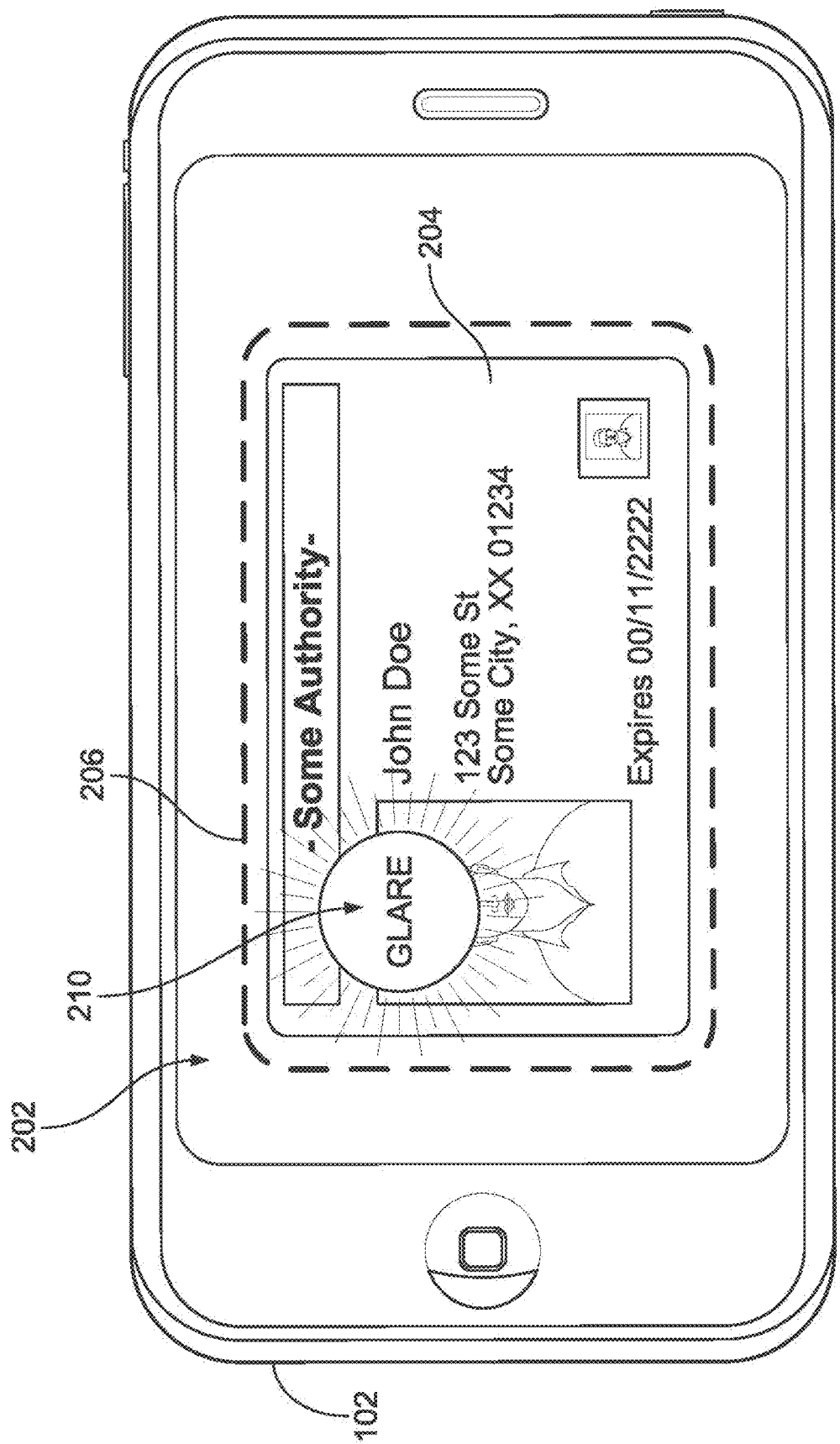

As illustrated in FIG. 3, light reflections from the surface of the ID document 104 can create lighting artifacts such as glare 210 (or shadows) in images of the ID document 204. Glare 210 tends to obscure portions of the ID document 204 in the images, which can in turn pose difficulties for electronic ID authentication using the images. For instance, glare 210 can cause errors in text recognition and/or feature recognition processes that may be performed by authentication server 108 to verify the authenticity of the ID document 104 from the images. Moreover, other lighting artifacts, e.g., shadows, can pose similar problems for verifying the authenticity of the ID document 104 from the images.

Such reflections (or shadows) can be reduced or eliminated by manipulating the position of the ID document 104, the orientation of the ID document 104, or both relative to the camera. The user computing device 102 can be configured to modify the image capture guide 206 shown in the preview window 202. The modification to the image capture guide 206 in the preview window 202 is intended to prompt the user 106 to manipulate the ID document 104 within the camera's FOV in a way that aligns the ID document 104 to the modified capture guide 206. For example, the capture guide 206 can be modified in a way that prompts the user to manipulate the ID document 104 within the camera's FOV to redirect the reflections away from the camera's lens, thereby, reducing, shifting, or eliminating the apparent glare 210 in images of the ID document 104. For example, the user computing device 102 can modify the size, shape, location, or orientation of the image capture guide 206.

Figure 4:
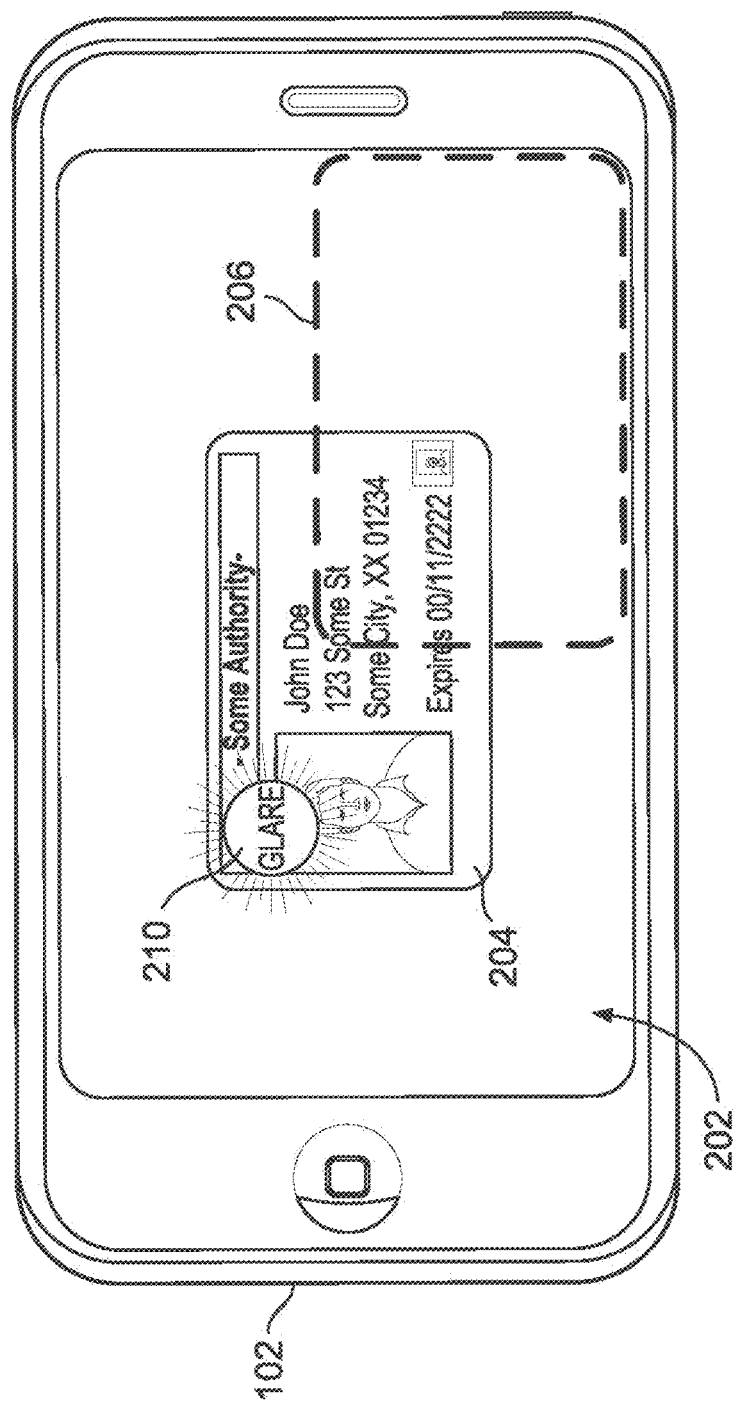
FIGS. 4 and 5 depict graphical representations of an example modification applied to a capture guide in an image preview window according to implementations of the present disclosure.
Figure 5:
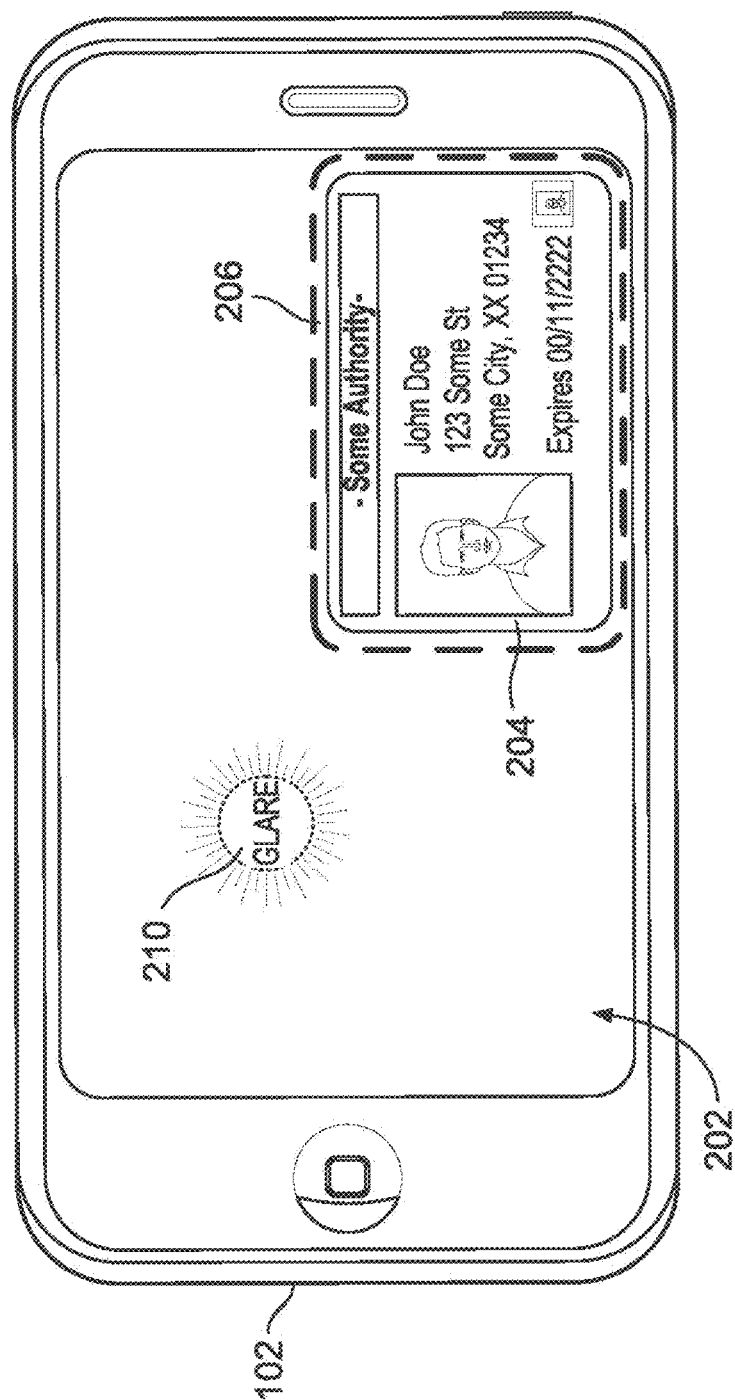

FIGS. 4 and 5 depict graphical representations of an example modification applied to a capture guide 206 in an image preview window 202 of the user computing device 102. FIG. 4 shows the position of the image capture guide 206 as being moved to the lower right corner of the image preview window 202. For example, FIG. 4 illustrates how a lighting artifact such as glare 210 might obscure part of the preview image 204 of the ID document 104. The glare 210 can make verification of the document less accurate. As illustrated in FIG. 4, the user computing device 102 translates the image capture guide 206 away from the center of the preview window 202, and away from the relative location of the glare 210. For example, the user computing device 102 translates the image capture guide 206 to the lower right-hand corner of the preview window 202. The translation of the image capture guide 206 is intended to encourage the user to move the ID document 104 (or the camera) to re-align the preview image 204 of the ID document 104 with the image capture guide 206 and continue the capture session. In some implementations, the user computing device 102 moves the image capture guide in a direction that positions the image capture guide 206 furthest from the glare 210 shown in the preview image 204. For instance, moving the image capture guide 206 to the right-hand side of the preview window 202 (as shown in FIG. 4) places the image capture guide 206 further from the glare 210 than moving the image capture guide 206 to the left-hand side of the preview window 202.

FIG. 5 shows the image capture guide 206 with the modification as applied in FIG. 4, but after the user has adjusted the position of the ID document 104 relative the camera to compensate for the modification to the image capture guide 206. For example, as illustrated in FIG. 5, the user has moved the ID document 104 so that the preview image 204 of the ID document is re-aligned with the image capture guide 206. Furthermore, such translation of the ID document 104 relative to the camera may be sufficient to reduce or eliminate glare (or shadows) from the preview image 204, by for example, moving the ID document 104 into a region of the camera FOV that is shaded from a direct light and into a region of more diffuse light. In some implementations, the user computing device 102 automatically captures a still image when the ID document in the preview image 204 is aligned with the image capture guide 206. In some implementations, the user computing device 102 automatically captures several still images of the ID document, e.g., after modifying the image capture guide 206. For example, the user computing device 102 can capture the still images while the user is re-aligning the ID document in the preview image 204 with the image capture guide 206.

Figure 6:
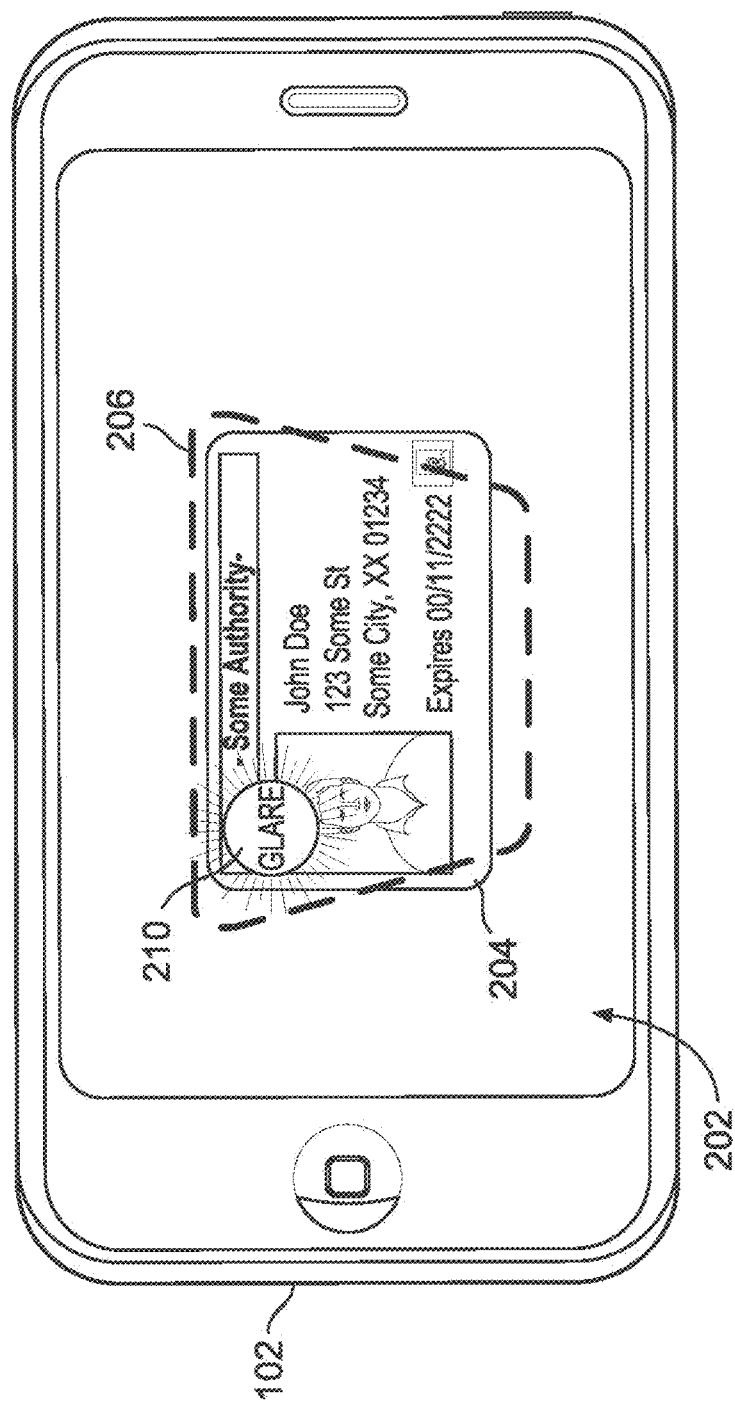
FIGS. 6 and 7 depict graphical representations of another example modification applied to a capture guide in an image preview window according to implementations of the present disclosure.
Figure 7:
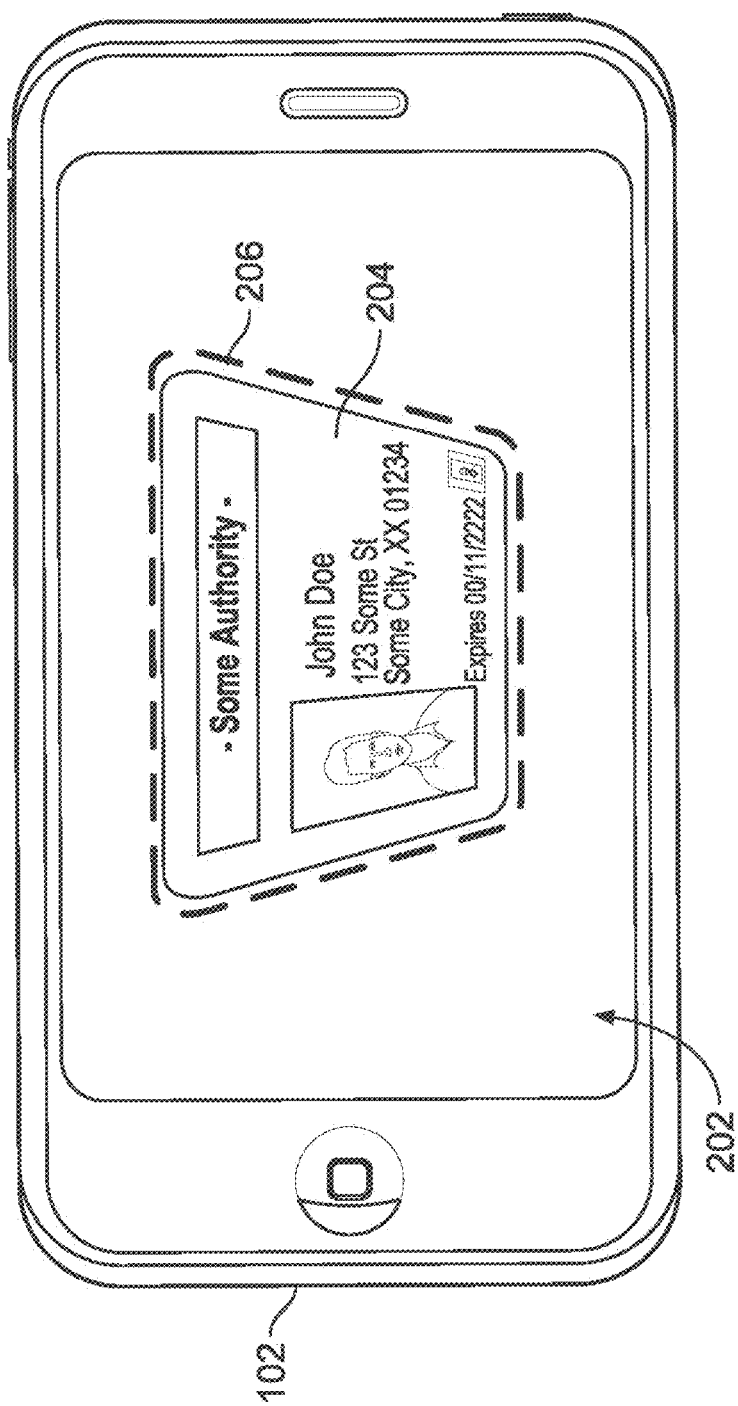

FIGS. 6 and 7 depict graphical representations of another example modification applied to a capture guide 206 in an image preview window 202 of the user computing device 102. FIG. 6 shows the image capture guide 206 as being skewed at one side (i.e., the bottom side) to appear tilted downwards. For example, the user computing device 102 modifies the shape of the image capture guide 206 to prompt the user to tilt the ID document relative to the camera. In other words, the user computing device 102 skews the shape of the image capture guide 206 so as to have an outline that approximates the outline of a tilted ID document.

FIG. 7 shows the image capture guide 206 with the modification as applied in FIG. 6, but after the user has adjusted the position of the ID document 104 relative the camera to compensate for the modification to the image capture guide 206. For example, as illustrated in FIG. 7, the user has moved the ID document 104 so that the preview image 204 of the ID document is re-aligned with the image capture guide 206. Specifically, in the example shown, the user has tilted the ID document 104 downward so that the preview image 204 is approximately aligned with skewed image capture guide 206. Furthermore, the orientation change of the ID document 104 may be sufficient to reduce or eliminate glare from the preview image 204, by for example, redirecting the reflected light that caused the glare 210 shown in FIG. 6. In some implementations, the user computing device 102 automatically captures a still image when the ID document in the preview image 204 is aligned with the image capture guide 206. In some implementations, the user computing device 102 automatically captures several still images of the ID document, e.g., after modifying the image capture guide 206. For example, the user computing device 102 can capture the still images while the user is re-aligning the ID document in the preview image 204 with the image capture guide 206.

In addition to the exemplary modifications to the image capture guide 206 described above, other modifications are possible such as, but not limited to, rotating the image capture guide 206 and scaling the size of the image capture guide 206. In some examples, rotation of the image capture guide can be considered to include out-of-plane rotation (e.g., tilting) as well as in-plane-rotation. In some implementations, multiple modifications can be applied to the image capture guide 206 either in a series progression of modifications or at the same time. For example, a series progression of modifications to the image capture guide 206 can be applied to prompt the user to change the orientation and/or position of the ID document relative to the camera in several different ways. For example, the user computing device 102 can translate the image capture guide 206. Then, once the user re-aligns the preview image 204 with the translated image capture guide 206, the user computing device 102 can change the shape of the image capture guide 206. Again, once the user re-aligns the preview image 204 with the reshaped image capture guide 206, the user computing device 102 can modify the image capture guide 206 in another manner.

In some implementations, the user computing device 102 can be configured to detect lighting artifacts (e.g., glare or shadows) in the images of the ID document 104 and modify the image capture guide 206 in response to detecting the lighting artifacts. For example, the user computing device 102 can detect lighting artifacts using image processing techniques such as edge or contrast detection. The user computing device 102 can then modify shape, position, orientation, etc. of the image capture guide 206 in response to detecting glare or shadows. In some implementations, the user computing device 102 can use characteristics of the detected glare or shadow (e.g., location on the ID document, intensity, size, etc.) to identify an appropriate type of modification to apply to the image capture guide 206 in order to prompt a user to appropriately manipulate the ID document 104 to reduce the glare or shadow. For example, the user computing device 102 can include a set of rules that map various lighting artifact characteristics to different types of image capture guide modifications.

In some implementations, the user computing device 102 can automatically capture a still image of the ID document 104 when the user manipulates the ID document appropriately. For example, the user computing device 102 can capture a still image when the orientation of the preview image 204 of the document approximately matches the image capture guide 206. For example, the user computing device 102 can use edge detection technique's to determine when the outline of the ID document 104 in the preview image 204 approximately matches the orientation depicted by the image capture guide 206.

In some examples, an indicator, a message, a graphic, an animation, or a combination thereof can be displayed in the image preview window 202 to explain the action being solicited to re-align the ID document in the preview image 204 with the modified image capture guide 206. For example, a message or graphic can be displayed to explain the required action to align the ID document 104 with the image capture guide 206. A message may be displayed to inform a user to tilt the ID document 104 if the capture guide 206 is skewed to illustrate a perspective change to the capture guide 206.

In some implementations, the image capture guide 206 can be modified as a default operation during image capture to prompt acquisition of multiple still images with variations in the orientation/position of the ID document 104. Specifically, implementations can use a single frame for each capture and then use a stitching process to bind together components from multiple frames. In some implementations, multiple still images of the ID document 104 can be captured while a user moves the ID document 104 in response to modifications of the image capture guide 206, and the user computing device 102 selects the best (or the best few) images in total to submit for authentication without performing image stitching.

Once one or more still images have been captured, authentication operations may be performed. For example, referring back to FIG. 1, the user computing device 102 can send the still images of the document to authentication server 108. Authentication server 108 can perform image processing operations such as optical character recognition (OCR), barcode decoding, or other data retrieval functionality to extract authentication features from the image(s) of the ID document 104. Authentication server 108 can send a response to the user computing device 102 that indicates whether or not the ID document 104 is authentic.

In some implementations, modifications to the image capture guide 206 can be performed as a liveness detection feature for document authentication. For example, one or more different modifications can be applied to image capture guide 206 at different times to prompt the user to move the document in various ways as discussed above. The "liveness" of the document images can be detected by capturing several still images as the user presumably moves the document. The liveness of the images can be verified by detecting the different orientations of the ID document 104 depicted in the images. That is, the images will capture a "live" user's movement of the ID document 104. Either the images capturing the movement, or data indicating a determination of "liveness" can be sent to the authentication server 108 for evaluation during document authentication as proof of "liveness."

In some implementations, the user computing device 102 can be configured to detect a document security feature in the images of the ID document 104 and modify the image capture guide 206 in response to detecting the security feature. Document security features can include, but are not limited to, a hologram, watermark, laser engraving, embossing, or a combination thereof. For example, the user computing device 102 can detect a security feature on the ID document 104 using image processing techniques such as edge detection, contrast detection, or object recognition. The user computing device 102 can then modify the image capture guide 206 in response to detecting the security feature. For example, some security features may be enhanced by light reflections, so modifications to the image capture guide 206 can be used to prompt the user 106 to manipulate the ID document 104 in a manner that accentuates the security feature. The user computing device 102 can capture one or more still images of the ID document 104 in a position that accentuates the security feature to aid with the authentication of the ID document 104.

Figure 8:
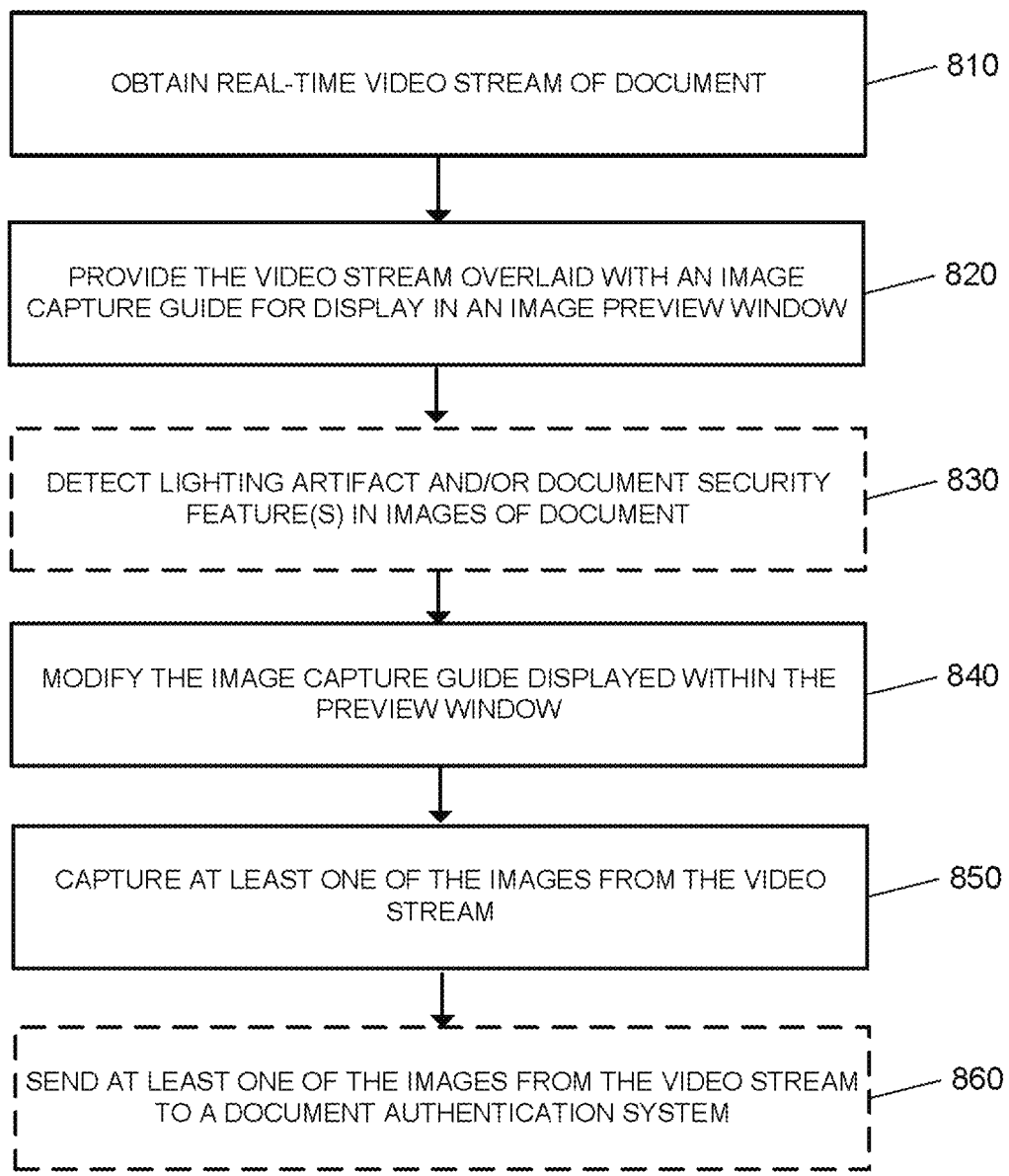
FIG. 8 is a flowchart of an example process for guiding a user to manipulate a document to reduce glare in images of a document.

FIG. 8 is a flowchart of an example process 800 for reduction of lighting artifacts (e.g., glare and/or shadows) in imaging a document. The operations of process 800 can be performed by a user computing device (e.g., computing device 102 of FIG. 1) that is configured to capture images. For example, process 800 can be performed by a mobile computing device with an integrated camera (e.g., a smartphone or tablet computer), a laptop computer coupled to an integrated or external camera, or a desktop computer with an integrated or external camera. In some examples, the example process 800 can be provided by one or more computer-executable programs executed using one or more computing devices. For example, the example process 800, or portions thereof, can be provided by one or more programs executed by one or more computing devices. That is, in some implementations, process 800 can be executed in a distributed computing environment (e.g., some portions of process 800 can be executed by a user computing device while other portions are executed by a server system or other computing device).

The process 800 includes obtaining a real-time video stream of a document (810). For example, computing device 102 can obtain a video stream from an image capture device (e.g., a camera) that is coupled to the computing device 102.

The video stream can include a series of images of a document (e.g., an identification document). For example, image capture device can capture images at a predefined frame rate (e.g., 15-120 fps).

The process 800 includes providing the video stream overlaid with an image capture guide for display in an image preview window (820). For example, the computing device 102 presents a real-time preview image (e.g., the video stream) with a graphical image capture guide overlaid thereon.

The process 800 includes detecting a lighting artifact and/or document security feature(s) in images of the document (830). For example, the computing device 102 can detect lighting artifacts such as glare or shadows in the images of the video stream using image processing techniques such as edge or contrast detection. For example, the computing device 102 can detect the shape of glare or shadow by detecting sharp differences in contrast between nearby pixels. As another example, the computing device 102 can detect a security feature on the ID document 104 using image processing techniques such as edge detection, contrast detection, or object recognition. Document security features can include, but are not limited to, a hologram, watermark, laser engraving, embossing, or a combination thereof.

The process 800 includes modifying the image capture guide (840). For example, the computing device 102 can modify attributes of the image capture guide including, but not limited to the size, shape, orientation, or position of the image capture guide. The modification to the image capture guide is such as to cause the user to manipulate the position of the document relative to the lens of the image capture device in a manner that attempts to align the ID document as depicted in the preview image with the modified image capture guide. For example, a user may rotate, tilt, or re-position the ID document relative to the lens of the image capture guide to align the preview image with the modified image capture guide. In so doing, the modification to the image capture guide prompts the user to move the document in a manner that also changes the lighting on the document that produces a glare or shadow in an attempt to reduce or eliminate the glare or shadow. In some implementations (e.g., in which a security feature is detected), a particular modification to the image capture guide can be selected that prompts the user to manipulate the document in a manner that increases glare on part of the document so as to amplify an effect of the security feature.

The process 800 includes capturing at least one of the images from the video stream (850). For example, computing device 102 can capture one of the images of the video stream. For example, computing device 102 can capture the image after the user has moved the document to re-align a preview image with the modified image capture guide.

The process 800 includes sending at least one of the images from the video stream to a document authentication system (860). For example, the computing device 102 can send one or more of the images to a document authentication server to have the authenticity of the document verified. The authentication server can then provide authentication data to the computing device 102 that indicates whether the document in the image(s) is authentic or fraudulent.

In some implementations, step 830, step 860, or both are optional. For example, process 800 can be performed before a lighting artifact is detected or without performing a lighting artifact detection step. As another example, process 800 can be performed without sending an image to a document authentication server. For example, the computing device 102 can store one or more images from the video stream in local memory or send the images to a data storage server (e.g., a cloud server).

Figure 9:
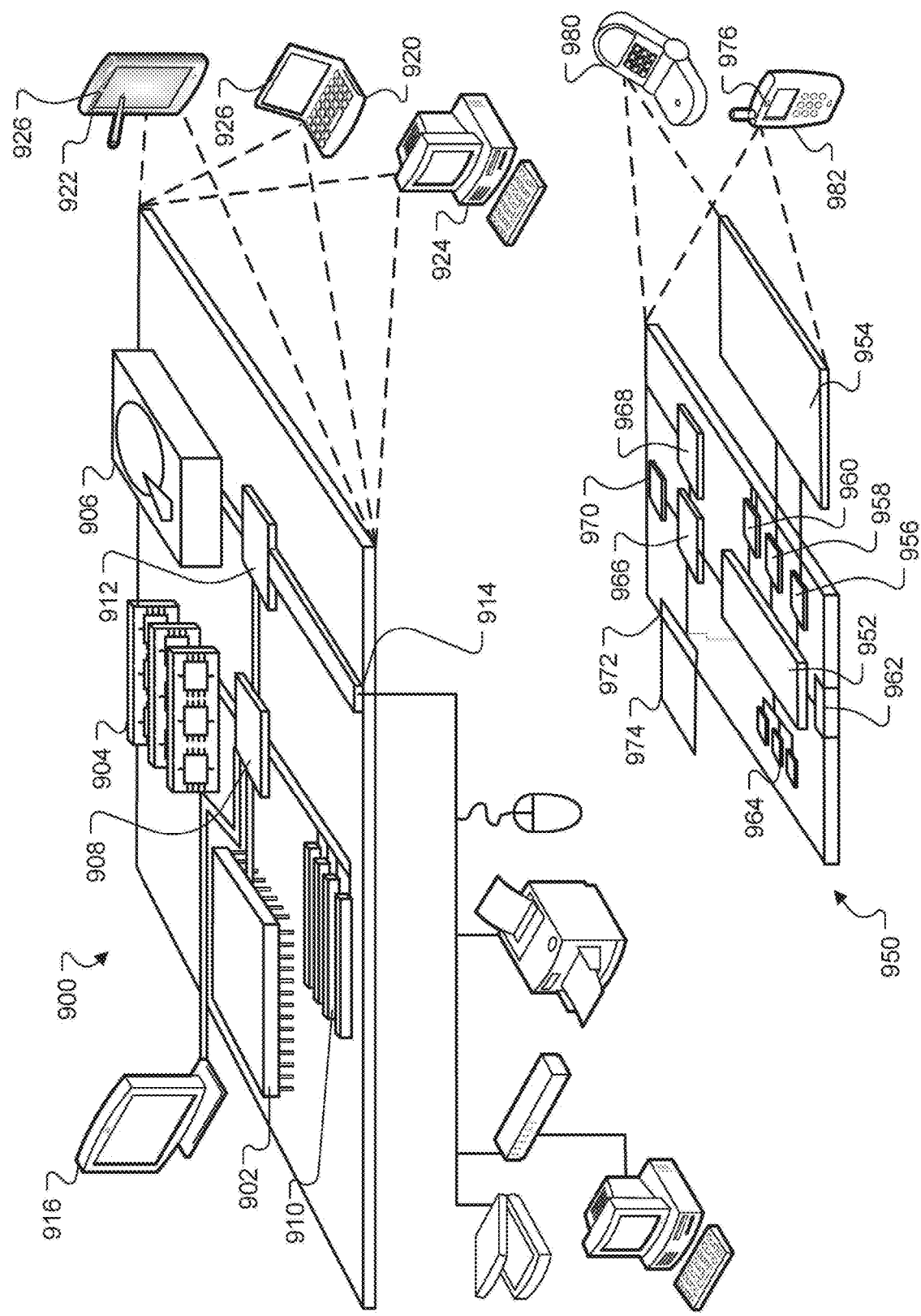
FIG. 9 is a diagram of exemplary computing devices, according to implementations of the present disclosure.

FIG. 9 shows an example of a computing device 900 and a mobile computing device 950 that can be used to implement the techniques described herein. The computing device 900 is intended to represent various forms of digital computers, such as laptops, desktops, workstations, personal digital assistants, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. In some examples, the computing device 900 includes a camera 926. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a graphical user interface (GUI) on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile or non-volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) can be coupled to one or more input/output devices, such as a keyboard, a pointing device, a scanner, a camera (e.g., a web camera), or a networking device such as a switch or router, e.g., through a network adapter.

The computing device 900 can be implemented in a number of different forms, as shown in the figure. For example, it can be implemented in a personal computer such as a laptop computer 920. It can also be implemented as a tablet computer 922 or a desktop computer 924. Alternatively, components from the computing device 900 can be combined with other components in a mobile device, such as a mobile computing device 950. Each type of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, a transceiver 968, and a camera 976, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chip set of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can include appropriate circuitry for driving the display 954 to present graphical and other information to a user. The control interface 958 can receive commands from a user and convert them for submission to the processor 952. In addition, an external interface 962 can provide communication with the processor 952 so as to enable near area communication of the mobile computing device 950 with other devices. The external interface 962 can provide, for example, wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 can include instructions to carry out or supplement the processes described above, and can include secure information also. Thus, for example, the expansion memory 974 can be provided as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, instructions are stored in an information carrier that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (Code Division Multiple Access), TDMA (Time Division Multiple Access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, may include recorded sound (e.g., voice messages, music files, etc.) and may also include sound generated by applications operating on the mobile computing device 950.

The mobile computing device 950 can be implemented in a number of different forms, as shown in the figure. For example, it can be implemented as a cellular telephone 980. The mobile computing device 950 can also be implemented as part of a smart-phone 982, tablet computer, personal digital assistant, or other similar mobile device.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Although the present disclosure is described in the context of capturing images of documents, and specifically ID documents, the techniques, systems, and devices described herein can be applicable in other contexts as well. For example, the techniques, systems, and devices described herein may be used for capturing digital images of, other types of documents, bank checks, printed photographs, etc.

What is claimed is:

1. A computer implemented glare reduction method executed by one or more processors, the method comprising:
   obtaining, in real-time from an image capture device, a video stream comprising images of a document;
   providing, for display in an image preview window, the video stream overlaid with a graphical capture guide;
   modifying the graphical capture guide within the image preview window, thereby, prompting a user to move the document with respect to the image capture device to substantially match the document to the graphical capture guide as modified; and
   capturing at least one image of the document from the video stream when the document as depicted in the at least one image substantially aligns with the graphical capture guide as modified.

2. The method of claim 1, wherein modifying the graphical capture guide within the image preview window comprises translating the graphical capture guide away from a center of the image preview window.

3. The method of claim 1, wherein modifying the graphical capture guide within the image preview window comprises skewing one side of the graphical capture guide causing the graphical capture guide to have a tilted perspective.

4. The method of claim 1, wherein modifying the graphical capture guide within the image preview window comprises rotating the graphical capture guide.

5. The method of claim 1, further comprising:
   sending at least one of the images of the document from the video stream to a server; and
   receiving, from the server, a response indicating an authenticity of the document.

6. The method of claim 1, further comprising in response to detecting a security feature on the document in one or more of the images of the video stream:
   capturing at least one of the one or more of the images of the video stream; and
   sending the at least one of the one or more images to a server.

7. The method of claim 1, further comprising:
   identifying, from the images of the document in the video stream, movement of the document relative to the image capture device in response to modifying the graphical capture guide in the image preview window; and
   in response to identifying the movement of the document, providing, to a server, data confirming liveness of the images of the document in the video stream.

8. The method of claim 1, wherein the modification to the graphical capture guide within the image preview window is applied in response to detecting a lighting artifact in at least one image of the video stream.

9. A device comprising:
   one or more processors;
   an image capture device in communication with the one or more processors; and
   one or more data stores coupled to the one or more processors having instructions stored thereon which, when executed by the one or more processors, causes the one or more processors to perform operations comprising:
      obtaining, in real-time from the image capture device, a video stream comprising images of a document;
      providing, for display in an image preview window, the video stream overlaid with a graphical capture guide;
      modifying the graphical capture guide within the image preview window, thereby, prompting a user to move the document with respect to the image capture device to substantially match the document to the graphical capture guide as modified; and
      capturing at least one image of the document from the video stream when the document as depicted in the at least one image substantially aligns with the graphical capture guide as modified.

10. The device of claim 9, wherein modifying the graphical capture guide within the image preview window comprises translating the graphical capture guide away from a center of the image preview window.

11. The device of claim 9, wherein modifying the graphical capture guide within the image preview window comprises skewing one side of the graphical capture guide causing the graphical capture guide to have a tilted perspective.

12. The device of claim 9, wherein modifying the graphical capture guide within the image preview window comprises rotating the graphical capture guide.

13. The device of claim 9, wherein the operations further comprise:

sending at least one of the images of the document from the video stream to a server; and receiving, from the server, a response indicating an authenticity of the document.

14. The device of claim 9, wherein the operations further comprise in response to detecting a security feature on the document in one or more of the images of the video stream:

capturing at least one of the one or more of the images of the video stream; and sending the at least one of the one or more images to a server.

15. The device of claim 9, wherein the operations further comprise:

identifying, from the images of the document in the video stream, movement of the document relative to the image capture device in response to modifying the graphical capture guide in the image preview window; and in response to identifying the movement of the document, providing, to a server, data confirming liveness of the images of the document in the video stream.

16. A non-transitory computer readable storage medium storing instructions that, when executed by at least one processor, cause the at least one processor to perform operations comprising:

obtaining, in real-time from an image capture device, a video stream comprising images of a document;

providing, for display in an image preview window, the video stream overlaid with a graphical capture guide;

modifying the graphical capture guide within the image preview window, thereby, prompting a user to move the document with respect to the image capture device to substantially match the document to the graphical capture guide as modified; and capturing at least one image of the document from the video stream when the document as depicted in the at least one image substantially aligns with the graphical capture guide as modified.

17. The medium of claim 16, wherein modifying the graphical capture guide within the image preview window comprises translating the graphical capture guide away from a center of the image preview window.

18. The medium of claim 16, wherein the operations further comprise:

identifying, from the images of the document in the video stream, movement of the document relative to the image capture device in response to modifying the graphical capture guide in the image preview window; and in response to identifying the movement of the document, providing, to a server, data confirming liveness of the images of the document in the video stream.

19. The medium of claim 16, wherein modifying the graphical capture guide within the image preview window comprises skewing one side of the graphical capture guide causing the graphical capture guide to have a tilted perspective.

20. The medium of claim 16, wherein modifying the graphical capture guide within the image preview window comprises rotating the graphical capture guide.

\* \* \* \* \*